United States Patent
Novellani et al.

(10) Patent No.: US 9,863,568 B2
(45) Date of Patent: Jan. 9, 2018

(54) DAMPENING DEVICE

(71) Applicant: MGI COUTIER, Champfromier (FR)

(72) Inventors: Marc Novellani, Travaillan (FR); Peter Faulstroh, Sutton Coldfield (GB); Pierre Laurent, Lessard le National (FR)

(73) Assignee: MGI COUTIER, Champfromier (FR)

( * ) Notice: Subject to any disclaimer, the term of this patent is extended or adjusted under 35 U.S.C. 154(b) by 0 days.

(21) Appl. No.: 15/068,989

(22) Filed: Mar. 14, 2016

(65) Prior Publication Data
US 2016/0265706 A1   Sep. 15, 2016

(30) Foreign Application Priority Data

Mar. 13, 2015 (FR) .................... 15/00497

(51) Int. Cl.
F16L 55/04    (2006.01)
F02M 37/00    (2006.01)
F16L 55/027   (2006.01)
F16L 55/033   (2006.01)

(52) U.S. Cl.
CPC ......... F16L 55/04 (2013.01); F02M 37/0041 (2013.01); F16L 55/0279 (2013.01); F16L 55/0332 (2013.01); F16L 55/0336 (2013.01)

(58) Field of Classification Search
CPC ...... F16L 55/043; F16L 55/053; F16L 55/045
USPC ...................... 138/26, 30; 220/721
See application file for complete search history.

(56) References Cited

U.S. PATENT DOCUMENTS

| 3,061,039 | A  | * | 10/1962 | Peters     | F16L 55/02 138/121 |
| 3,665,967 | A  | * | 5/1972  | Kachnik    | F16L 55/05 138/137 |
| 4,651,781 | A  | * | 3/1987  | Kandelman  | F15B 1/086 138/26 |
| 4,897,906 | A  | * | 2/1990  | Bartholomew | F16L 55/05 138/26 |
| 6,672,337 | B2 | * | 1/2004  | Kobayashi  | F16L 55/045 137/207 |
| 7,562,678 | B1 | * | 7/2009  | Kulikov    | F16L 55/041 137/207 |
| 8,499,796 | B1 | * | 8/2013  | Kulikov    | F16L 55/041 137/207 |
| 8,757,668 | B2 | * | 6/2014  | Haeckel    | F16L 55/02 138/28 |
| 2014/0130887 | A1 | * | 5/2014 | Byrne      | F04B 11/0008 137/15.01 |

* cited by examiner

Primary Examiner — Patrick F Brinson
(74) Attorney, Agent, or Firm — Oliff PLC

(57) ABSTRACT

This dampening device comprises a body defining a chamber and presenting at least one orifice intended for the inlet and the outlet of the fluid in the chamber. The dampening device further comprises i) a dampening member located in the chamber and comprising at least one foam with closed cells, and ii) a holding member configured to hold the dampening member in place. The dampening device being characterized in that at least one foam has a porosity comprised between 50% and 98%.

16 Claims, 4 Drawing Sheets

DAMPENING DEVICE

The present invention concerns a dampening device, for dampening pressure pulsations which may propagate in a fluid conduit, for example, in a fuel conduit for a motor vehicle.

The present invention applies to the field of fluid conduits in which pressure pulsations or peaks may occur. In particular, the present invention applies to the field of fluid conduits for a motor vehicle, in particular for utility vehicles, passenger vehicles and heavy goods vehicles. More particularly, the present invention applies to the field of fuel conduits, not only fuel supply conduits but also fuel return conduits.

In the state of the art, there is a dampening device comprising a conduit composed of an elastically deformable material, for example a rubber. During pressure pulsations, the rubber-made conduit is deformed, thereby partially dampening the pressure pulsations. Moreover, there is a dampening device comprising a body defining a chamber and presenting two orifices for the inlet and the outlet of the fluid in the chamber. Walls are arranged in the body and the orifices are positioned so that the walls and the fluid contained in the chamber trap air. During pressure pulsations, the trapped air is compressed, thereby partially dampening the pressure pulsations.

However, in a large number of applications, the dampening devices of the state of the art do not sufficiently dampen the pressure pulsations (rubber-made conduits) and/or are too bulky and/or generate major implantation constraints (such as, for example, the dampening devices with an air trap).

The present invention aims in particular to resolve all or part of the aforementioned problems.

For this aim, the object of the present invention is a dampening device, for dampening pressure pulsations which may propagate in a fluid conduit, for example in a fuel conduit for a motor vehicle, the dampening device comprising a body defining a chamber and having at least one orifice intended for the inlet and the outlet of the fluid in the chamber;

the dampening device being characterized in that it further comprises at least:
- a dampening member located in the chamber, the dampening member comprising at least one foam, said at least one foam being elastically deformable and including closed cells containing at least one compressible gas, and
- a holding member configured to hold the dampening member in place.

The compressible gas may be selected, for example, in the group consisting of air, carbon dioxide ($CO_2$) or nitrogen ($N_2$). For example, the compressible gas contained in the closed cells may be substantially under atmospheric pressure when the foam is in the non-deformed condition. According to another example, the compressible gas contained in the closed cells may be under a pressure of 2 bar when the foam is in the non-deformed condition in a dampening device intended to work with a fluid average pressure of 3 bar.

According to a variant, the body may be composed of several assembled parts.

The holding member has, in particular, the function of preventing the foam from being displaced or deformed in an excessive manner, which might otherwise partially or completely obstruct the fluid path in the chamber. Furthermore, the displacement of the dampening member in an inappropriate position may degrade its effectiveness.

According to a variant, the holding member is connected to the body by at least one mechanical connection with low or zero mobility. In other words, said at least one mechanical connection significantly limits the motions or travels of the holding member relative to the body.

Alternatively to this variant, the holding member is secured to the body. For example, the holding member is integral with the body. According to another example, the dampening device further comprises at least one securing member configured to secure the holding member to the body. The securing member may comprise elastic snap-fit elements. Thus, such a securing member immobilizes the holding member with respect to the body, thereby preventing the holding member from generating noise by knocking, for example, on the body under the effect of the pressure pulsations, and therefore, preventing the holding member from obstructing the fluid flow in the chamber.

Alternatively, the holding member may be secured to the body by cooperation of complementary portions belonging respectively to the holding member and to the body. Thus, such securing is achieved without any securing member.

According to a variant, the body may be metallic or thermoplastic. For example, the body may comprise a material selected in the group consisting of a polyamide 6,6 (PA66), a polyamide 12 (PA12) and a polyphthalamide (PPA), this material being possibly filled with glass fibers, According to a variant, the body presents one single orifice intended for the inlet and the outlet of the fluid in the chamber. In this variant, the dampening device is equipped with a «T» fitting in order to enable the circulation of the fluid to and from the chamber.

Alternatively to this variant, the body defines a chamber and has at least two orifices intended for the inlet and the outlet of the fluid in the chamber. In an application where the fluid may circulate in one direction or in the opposite direction, each orifice serves successively as an inlet and an outlet.

According to an embodiment, at least one foam includes open cells, the number of closed cells being larger than the number of open cells.

According to a variant, the proportion of closed cells to the total number of cells is larger than 60%, preferably larger than 80%. The total number of cells is the sum of the number of closed cells and the number of open cells. Within a foam, the closed cells actually contribute the most in dampening the pressure pulsations, because the closed cells are filled with a compressible gas, whereas the open cells may be filled with fluid, because the open cells can communicate with the outside of the foam.

According to a variant, each closed cell has dimensions comprised between 10 μm and 500 μm.

According to an embodiment, at least one foam has a porosity comprised between 50% and 98%.

Thus, such a foam may contain, within its closed cells, an amount of compressible gas which allows ensuring a high compliance.

In the present Application, the term «porosity» refers to the ratio of i) the sum of the volumes of the closed cells and open cells contained in the foam, to ii) the total volume of the foam.

According to an embodiment, at least one foam has a compressive strength comprised between 15 kPa and 1000 kPa, the compressive strength being measured according to the ASTM D1056-07 test method at 25% of compression ratio said foam.

Thus, such a compressive strength allows the foam to be slightly deformed at the nominal average operating pressure, so as to allow for an additional deformation potential (elastic reserve) in the case of a temporary pressure peak or overpressure. For example, a foam having a 100 kPa strength at 25% compression (compressed volume to volume at rest) can be deformed by 25% under a pressure of 1 bar, which is the nominal average pressure in a gasoil return conduit.

By way of non-limiting information, the compressive strength of this same foam is comprised between 50 kPa and 1500 kPa when it is measured according to the NF R 99211-80 test method at 50% of the compression ratio the foam.

According to a variant, at least one foam has a compressive strength comprised between 15 kPa and 150 kPa, the compressive strength being measured according to the ASTM D1056-07 test method at 25% of the compression ratio of said foam. Thus, such a foam allows the dampening device to dampen pressure pulsations in a fluid under an average pressure comprised between 0.5 bar and 3 bar. For example, the fuel return conduits operate at an average pressure comprised between 0.5 bar and 3 bar. By way of non-limiting information, the compressive strength of this same foam is comprised between 50 kPa and 300 kPa when it is measured according to the NF R 99211-80 test method at 50% compression of the foam.

Alternatively to this variant, at least one foam has a compressive strength comprised between 200 kPa and 1000 kPa, the compressive strength being measured according to the ASTM D1056-07 test method at 25% of the compression ratio of said foam. Thus, such a foam allows the dampening device to dampen pressure pulsations in a fluid under an average pressure comprised between 3 bar and 7 bar. For example, the fuel supply conduits operate at an average pressure comprised between 3 bar and 7 bar. By way of non-limiting information, the compressive strength of this same foam is comprised between 300 kPa and 1500 kPa when it is measured according to the NF R 99211-80 test method at 50% compression of the foam.

In the present Application, the pressures are expressed in bar relative. In the present Application, the term « average pressure » corresponds to the average, over a determined duration, of the pressure of the fluid with its pressure pulsations in the fluid conduit. The determined duration is selected to be significantly longer than the duration of the longest pressure pulsation to be damped. Typically, the determined duration necessary for calculating the average pressure is longer than 1 s, for example 1 min.

According to an embodiment, at least one foam has a thickness comprised between 4 mm and 20 mm.

Thus, such a thickness allows forming a foam which effectively dampens the pressure pulsations, while remaining slightly bulky in the thickness measuring direction.

According to an embodiment, at least one foam is configured to present:
- a compliance larger than 2 cm$^3$ when the average pressure of the fluid is equal to 1 bar,
- a compliance larger than 2.5 cm$^3$ when the average pressure of the fluid is equal to 2 bar, and
- a compliance larger than 3 cm$^3$ when the average pressure of the fluid is equal to 3 bar.

The compliance represents the capability of a foam to change its volume, by compression and/or expansion, under the effect of pressure pulsations in the fluid. Therefore, the compliance represents the capability of a flexible element, such as a foam, to change its volume under the effect of a pressure change. Therefore, the compliance of a foam is the change in volume of this foam for a given pressure change.

In order to measure the compliance, the foam is placed in a fluid-tight chamber, then subjected to a determined pressure. Hence, one measures:
- either the volume of fluid introduced in the chamber to bring the chamber, therefore subject the foam, to a given pressure (pressurization of the chamber),
- or the volume of fluid leaving the chamber brought, as the foam, to a given pressure (depressurization of the chamber).

These two volumes of fluid are identical. Each one of these two volumes of fluid corresponds to the compliance, that is to say to the change in the volume of the foam during the pressure change. Measurement of the compliance of a foam may be carried out over the entire range of the possible temperatures for the aimed application. Preferably, the used fluid is the actual fluid corresponding to the application. Nonetheless, it is possible to use a substitution fluid having properties which are identical to the properties of the fluid of the application, in particular the same compressibility.

In order to measure the aforementioned values of the compliance, we have to place a circular cylindrical foam with a 50 mm diameter and a 10 mm height inside a circular cylindrical chamber with a 50 mm diameter and a 20 mm height. Such a foam and such a chamber correspond to volumes representative of an application on a motor vehicle. By introducing a fluid under the aforementioned pressures in this chamber, it is possible to measure the aforementioned values of the compliance of this foam.

Thus, a foam having such a compliance allows for an effective dampening of each pressure pulsation over a wide range of frequencies and magnitudes, in particular in a fuel return conduit extending downstream of a supply pump intended to supply the engine block with fuel.

In practice, the foam is compressed by a pressure peak or pulsation, which reduces momentarily the volume of the foam, and therefore increases momentarily the free volume that the fluid may occupy. This increase of the free volume allows reducing instantaneously the pressure of the fluid, and therefore dampening the pressure pulsation.

In operation, such a foam may have a thickness change through elastic deformation comprised between 10% and 80% when the fluid is at an average pressure comprised between 0.5 bar and 1.5 bar. Therefore, at the average operating pressure, the foam has a potential, or a reserve, for elastic deformation which is enough for effectively dampening the pressure pulsations, because the foam is not compressed too much under the average operating pressure. Indeed, the more the foam is compressed, the more its compressive strength increases. In order that the foam can be deformed rapidly under the effect of pressure pulsations, the initial deformation under the average operating pressure must be as small as possible.

According to a variant, at least one foam is configured to have:
- a compliance larger than 2 cm$^3$ when the average pressure of the fluid is equal to 5 bar,
- a compliance larger than 2.5 cm$^3$ when the average pressure of the fluid is equal to 6 bar, and
- a compliance larger than 3 cm$^3$ when the average pressure of the fluid is equal to 7 bar.

Thus, such a foam allows the dampening device to dampen the pressure pulsations in a fluid under an average pressure comprised between 3 bar and 7 bar. For example, the fuel supply conduits operate at an average pressure comprised between 3 bar and 7 bar.

According to an embodiment, at least one foam is configured to have a volume change larger than 0.5 cm$^3$/bar when the average pressure of the fluid is comprised between 0 and 3 bar and when the average temperature of the fluid is comprised between −30° C. and 130° C.

The volume change is the difference between the volume of the foam at rest and the volume of the foam under a given fluid pressure, this volume change being added to the fluid pressure.

According to an embodiment, the dampening member has a contact surface arranged to be in contact with a fluid flow when the fluid circulates in the chamber;

the contact surface being sized so that the ratio between i) the surface area of the contact surface and ii) the volume of the foam is larger than 50 m$^{-1}$, preferably larger than 100 m$^{-1}$.

Thus, such a contact surface with the fluid is relatively extended, which allows achieving a highly effective dampening of the pressure pulsations. Indeed, an extended contact surface allows achieving a large compliance without any significant compression of the foam. Therefore, an extended contact surface allows i) making the foam work over a range of deformations where a larger volume of the foam is deformed under the effect of low pressures, ii) limiting the residual deformation of the foam, and iii) limiting the fatigue of the foam, which reduces the risks of degradation, cracking or break-up.

According to an embodiment, the dampening member has a contact surface arranged so as to be in contact with a fluid flow when the fluid circulates in the chamber;

the contact surface being sized so that the ratio between i) the surface area of the contact surface and ii) the total surface area of the chamber is larger than 10%, preferably larger than 20%.

Thus, such a contact surface with the fluid is relatively extended, which allows enhancing the effectiveness of the pressure pulsations dampening.

According to an embodiment, the dampening member has a contact surface arranged to be in contact with a fluid flow when the fluid circulates in the chamber;

the contact surface being sized so that the ratio between i) the surface area of the contact surface and ii) the surface area of a section of the body, along a plane which is perpendicular to a main direction of deformation of the foam and which extends close to the contact surface, is larger than 60%, preferably larger than 70%.

Thus, such a contact surface with the fluid is relatively extended, which allows enhancing the effectiveness of the pressure pulsations dampening.

According to a variant, the dampening member has a generally flat shape, and the contact surface is generally planar. This generally flat dampening member may be manufactured, for example, through a calendering step, then a cutting step through water jet, laser or die-cutter. Thus, the manufacture of such a dampening member is simple and economical. In addition, the absence of implantation constraints, in particular at the connections to the fluid conduit, allows for the use of a small number of foams and of geometries which are simple to implement.

Alternatively to this embodiment, the dampening member has a generally complex tridimensional shape. This dampening member with a complex tridimensional shape may be, for example, manufactured by molding. Thus, such a dampening member with a complex tridimensional shape may be installed, for example, in a housing with a complex shape, while maximizing the foam volume and the contact surface, and therefore the dampening effectiveness.

According to a variant, said at least one holding member, the body and/or said at least one dampening member are configured to limit the motions of said at least one dampening member in all three directions of the space. Advantageously, said at least one holding member, the body and/or said at least one dampening member are configured to immobilize said at least one dampening member in all three directions of the space. Thus, such a configuration prevents any risk of obstruction of the fluid flow by the foam.

According to a variant, the body and/or the plugging member may have (protruding and/or recessed) patterns, for example gadroons, configured to allow the fluid to flow on each side of the dampening member.

According to an embodiment, the body presents an opening communicating with the chamber, the dampening device further comprising a plugging member configured to plug the opening in a fluid-tight manner.

According to a variant, the plugging member is formed by a thin lid having a shape complementary to the opening. For example, the lid may be generally flat or curved.

In the case where the body and the plugging member are made of metallic materials, the plugging member may be assembled to the body by crimping. In the case where the body and the plugging member are made of plastic materials, the plugging member may be assembled to the body through ultrasonic welding, spin welding or laser welding.

The assembly method must preserve the integrity of the foam, for example by avoiding any friction against the foam or any contact between the foam and a sharp edge.

According to a variant, the holding member is secured to the plugging member. For example, the holding member may be integral with the plugging member.

According to a variant, the holding member is removably connected to the body and/or to the plugging member. In other words, the holding member is separate from the body and from the plugging member. According to a variant, the plugging member may be metallic or thermoplastic. For example, the plugging member may comprise at least one material selected in the group consisting of a polyamide 6,6 (PA66), a polyamide 12 (PA12) and a polyphthalamide (PPA), this material being possibly filled with glass fibers. In a possible manner, this material may comprise antistatic or electrically-conductive particles (carbon black, carbon fibers, carbon nanotubes), in order to drain electrostatic charges.

According to an embodiment, the chamber has a volume smaller than 150 cm$^3$, for example smaller than 50 cm$^3$, and said at least one foam has a foam volume representing between 15% and 70% of the volume of the chamber.

Thus, the dampening device crates a very low pressure drop in the fluid conduit, because the chamber can present a relatively large free space for the fluid to flow in the chamber, so that the dampening device preserves a flow section larger than or equal to the flow section of the other portions of the fluid conduit. In addition, such a dampening device is far more compact than the dampening devices of the state of the art with air traps.

According to a variant, the chamber has the general shape of a cylinder, and the holding member has the general shape of a cylinder, a clearance between the cylindrical walls of the holding member and the cylindrical walls of the chamber being smaller than 10 mm. Thus, for positive pressure pulsations (peaks) comprised between 0 and 3 bar, the foam effectively dampens the pressure pulsations, because the foam is provided with an elastic deformation potential despite the small volume of the chamber, and therefore, despite the small volume of foam.

According to an embodiment, the holding member defines at least one flow conduit through which the fluid can flow, said at least one flow conduit being configured to substantially modify the orientation of the fluid flow.

Thus, such a flow conduit contributes in splitting up the pressure pulsations, which further improves the dampening effectiveness.

According to a variant, the flow conduit presents at least one curve with a small radius of curvature, such as a baffle. For example, the radius of curvature may be smaller than 50 mm, or even smaller than 20 mm.

According to a variant, the dampening device comprises two dampening members arranged so that the fluid flows between the dampening members when the dampening device is in operation.

According to a variant, the two dampening members are located in two opposite portions of the chamber, for example, respectively in an upper portion of the chamber and in a lower portion of the chamber.

According to a variant, the dampening device may comprise one single holding member which is configured to hold the two dampening members in place.

Alternatively to this variant, the dampening device may comprise two holding members, each holding member being configured to hold a respective dampening member in place.

According to another variant, the dampening device may comprise more than two dampening members and/or more than two holding members.

According to an embodiment, at least one foam is composed of a material selected in the group consisting of a hydrogenated poly(butadiene-acrylonitrile) (HNBR), a fluorocarbon (FKM) and a fluorosilicone (FVMQ), a cross-linked polyamide (PA), a non-crosslinked polyamide (PA).

Thus, such a foam may chemically resist fuel, gasoil or gasoline, and prevent a significant migration of fuel inside the closed cells by permeability, which might reduce the elasticity of the foam.

According to a variant, at least one foam is composed of several different materials. These materials may be secured together, for example in the form of a stack or a juxtaposition of successive layers. Thus, such a foam including materials presenting different properties allows for an effective dampening of the pressure pulsations, for example over a high magnitude of pulsations and/or over a wide range of frequencies.

For example, at least one foam is composed of a first layer made of a very elastic material, so as to dampen pulsation peaks with low magnitudes, and a second layer made of a more rigid material. Thus, in the case of pressure pulsations with high magnitudes or in the case of an increase of the average pressure of the fluid, the layer made of a more rigid material dampens the pressure pulsations whereas the layer made of a more elastic material is too pre-stressed to do so.

According to a variant, the dampening member comprises a protective stratum arranged around said at least one foam, the protective stratum being composed of a fluid-resistant material, for example capable of resisting chemical, thermal or tribological stresses.

According to a variant, the protective stratum is formed by a flexible envelope in which the foam is disposed.

Alternatively to this variant, the protective stratum is formed by a film deposited over the foam.

Thus, such a protective stratum allows for the use of foams made of materials less expensive than fluid-resistant materials (examples: EPDM, NR, NBR, SBR).

According to an embodiment, at least one dampening member is configured to delimit, with the plugging member and/or with the body, a free volume containing a compressible gas.

Thus, such a free volume traps the compressible gas, so that the compressible gas can contribute in dampening the pressure pulsations having, for example a high intensity (high overpressures), when the foam is highly or excessively compressed.

According to a variant, at least one dampening member is configured to delimit, with the plugging member, a free volume containing a compressible gas.

Alternatively to this variant, at least one dampening member is configured to delimit, with the body, a free volume containing a compressible gas.

Moreover, the object of the present invention is a fluid conduit, for example a fuel conduit for a motor vehicle, comprising a dampening device according to the invention.

The aforementioned embodiments and variants may be considered separately or according to any technically possible combination.

The present invention will be better understood and its advantages will also appear in the light of the following description, given only but as a non-limiting example and with reference to the appended figures, in which identical references numerals correspond to structurally and/or functionally identical or similar elements.

Figure 1:
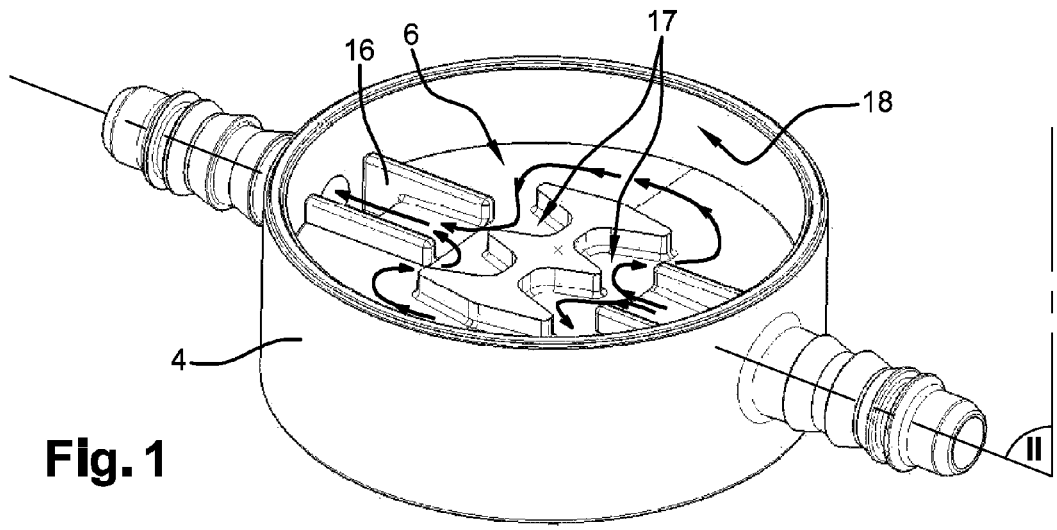
FIG. 1 is a schematic perspective view of a portion of a dampening device in accordance with a first embodiment of the invention, the plugging member and the dampening member do not appear.
Figure 2:
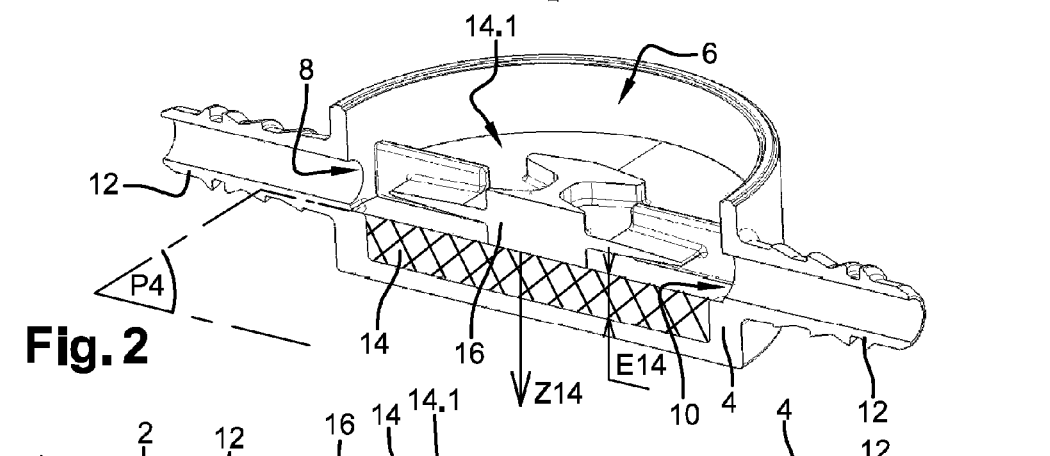
FIG. 2 is a truncated schematic perspective view, along the plane II in FIG. 1, of the portion of the dampening device of FIG. 1.
Figure 3:
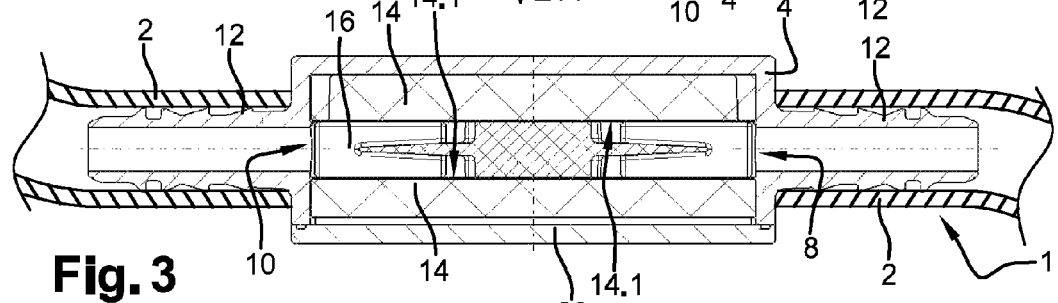
FIG. 3 is a section, along the plane II and reversed with reference to FIG. 2, of the dampening device of FIG. 1.

FIGS. 1, 2 and 3 illustrate a dampening device 1 in accordance with a first embodiment. The dampening device 1 has the function of dampening pressure pulsations which may propagate in a fluid conduit 2, which consists, in this case, of a gasoil fuel conduit for a motor vehicle.

The dampening device 1 comprises a body 4. The body 4 defines a chamber 6 and presents two orifices 8 and 10 intended for the inlet and the outlet of the fluid in the chamber 6. In the example of FIGS. 1 to 3, the body 4 includes two nozzles 12 which are configured to connect the fluid conduit 2 to the body 4.

The dampening device further comprises i) two dampening members 14 and ii) a holding member 16. Each dampening member 14 has, in particular, the function of dampening pressure pulsations when the dampening device 1 is in operation. Herein, the dampening members 14 are arranged so that the fluid flows between the dampening members 14 when the dampening device 1 is in operation.

The holding member 16 is located in the chamber 6. The unique holding member 16 is configured to hold the two dampening members 14 in place. Herein, the holding member 16 is removably connected to the body 4. Furthermore, the dampening device may comprise at least one rotational stop means configured to stop the holding member 16 rotating relative to the body 4 and to the chamber 6. For example, a wall of the chamber 6 may have a lug or a (protruding and/or recessed) pattern arranged to stop the rotating holding member 16.

Each dampening member 14 is located in the chamber 6. The dampening members 14 are disposed on either side of the holding member 16. Herein, the two dampening members 14 are located in two opposite portions of the chamber 6; in this case, these opposite portions are respectively represented at the upper portion of FIG. 3 and at the lower portion of FIG. 3.

Each dampening member 14 comprises a foam which is elastically deformable and which includes closed cells containing a compressible gas, in this case, air at atmospheric pressure.

Each foam has a thickness E14 equal to about 5 mm. Each foam has a foam volume representing about 25% of the volume of the chamber 6.

Herein, the chamber 6 has a volume equal to about 30 cm$^3$. The chamber 6 has the general shape of a cylinder. Herein, the holding member 16 defines flow conduits 17 through which the fluid can flow. The flow conduits 17 are configured to substantially modify the orientation of the fluid flow, as shown by the flow lines represented in FIG. 1.

Thus, the flow conduits 17 contribute in splitting up the pressure pulsations, which further enhances the dampening effectiveness. The flow conduits 17 may be asymmetrical in order to ensure a phase-shift of the pressure waves. Herein the flow conduits 17 present several curves with small radii of curvature and which therefore form baffles. Herein, the radii of curvature are smaller than 20 mm.

The holding member 16 has also the function of preventing each foam of the dampening members 14 from being displaced or deformed in an excessive manner, in order to avoid the partial or complete obstruction of the fluid path in the chamber 6 and/or one of the orifices 8 and 10.

Herein, the holding member 16 is connected to the body 4 through at least one mechanical connection with low mobility, in this case, a rotational stop and a plane abutment connection via the dampening members 14. Moreover, the holding member 16 may be more or less limited in its motions by specific forms, in order to guarantee its accurate positioning in the body 4. The body 4 presents an opening 18 which communicates with the chamber 6. As shown in FIG. 3, the dampening device 1 further comprises a plugging member 20 which is configured to plug the opening 18 in a fluid-tight manner. Herein, the plugging member 20 is formed by a thin lid having a shape complementary to the opening 18, in this instance a flat-disc shape.

In the example of FIGS. 1 to 3, each foam is composed of a hydrogenated poly(butadiene-acrylonitrile) (HNBR). Herein, each foam has a porosity equal to about 80%.

Each foam may also include open cells. The number of closed cells is larger than the number of open cells. Herein, the proportion of closed cells to the total number of cells is equal to about 90%.

Each foam presents a compressive strength comprised between 15 kPa and 150 kPa, the compressive strength being measured according to the ASTM D1056-07 test method at 25% of the compression ratio of said foam.

Herein, each foam is configured to present a compliance larger than 3 cm$^3$ when the pressure of the fluid reaches 3 bar, which generally corresponds to the highest peaks of pressure on a fuel return conduit when the dampening device 1 is in operation. Herein, each foam is configured to present a volume change larger than 0.5 cm$^3$/bar when the average pressure of the fluid is comprised between 0 and 3 bar and when the average temperature of the fluid is comprised between −30° C. and 130° C., namely a total volume change larger than 1 cm$^3$/bar.

Each dampening member 14 has a contact surface 14.1 which is arranged to be in contact with the fluid flow when the fluid circulates between the orifices 8 and 10. In the example of FIGS. 1 to 3, the dampening member 14 has the general shape of a flat disc and the contact surface 14.1 is generally planar.

The contact surface 14.1 is sized so that the ratio between i) the surface area of the contact surface 14.1 and ii) the volume of the foam is herein equal to about 180 m$^{-1}$.

In addition, each contact surface 14.1 is sized so that the ratio between i) the surface area of the contact surface 14.1 and ii) the total surface area of the chamber 6 is herein equal to about 50%.

Furthermore, each contact surface 14.1 is sized so that the ratio between i) the surface area of the contact surface 14.1 and ii) the surface area of a section of the body 4, along a plane P4 which is perpendicular to a main direction of deformation Z14 of the foam and which extends close to the contact surface 14.1, is herein equal to about 90% for one single contact surface 14.1, namely 180% for both contact surfaces 14.1. Thus, each contact surface 14.1 is relatively extended, which allows for an effective dampening of the pressure pulsations.

The main direction of deformation Z14 of the foam is the direction along which the foam is compressed the most when the pressure of the fluid is exerted on this dampening member 14. Therefore, the main direction of deformation Z14 of the foam is the direction along which the foam undergoes the largest dimensional change. In the example of FIGS. 1 to 3, the foam undergoes its largest dimensional change across its thickness E14.

When the dampening device 1 is in operation and a pressure pulsation (peak) occurs, the foam of each dampening member 14 is compressed by the pressure pulsation, which reduces momentarily the volume of each foam, and therefore increases momentarily the free volume that the fluid may occupy. This increase of the free volume allows reducing instantaneously the pressure of the fluid, and therefore, dampening the pressure pulsation.

Figure 4:
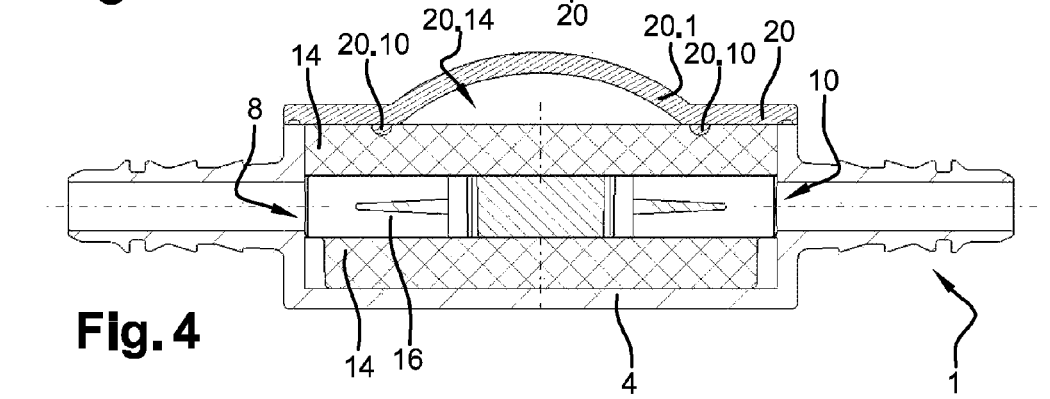
FIG. 4 is a view similar to FIG. 3 illustrating a dampening device in accordance with a second embodiment of the invention.

FIG. 4 illustrates a dampening device 1 in accordance with a second embodiment. To the extent that the dampening device 1 of FIG. 4 is similar to the dampening device 1 of FIGS. 1 to 3, the description of the dampening device 1, provided hereinbefore in relation with FIGS. 1 to 3, may be transposed to the dampening device 1 of FIG. 4, with the exception of the remarkable differences set out below.

The dampening device 1 of FIG. 4 differs from the dampening device 1 of FIGS. 1 to 3, essentially because the plugging member 20 is configured to delimit, with one of the dampening members 14, a free volume 20.14 which is filled with a compressible gas, here with air.

The plugging member 20 comprises, in this case, a curved portion 20.1 which delimits the free volume 20.14 with one of the dampening members 14. Furthermore, the plugging member 20 comprises lugs 20.10 which are pressed into the dampening member 14, so as to guarantee sealing of the air reserve 20.14 with this dampening member 14.

Figure 5:
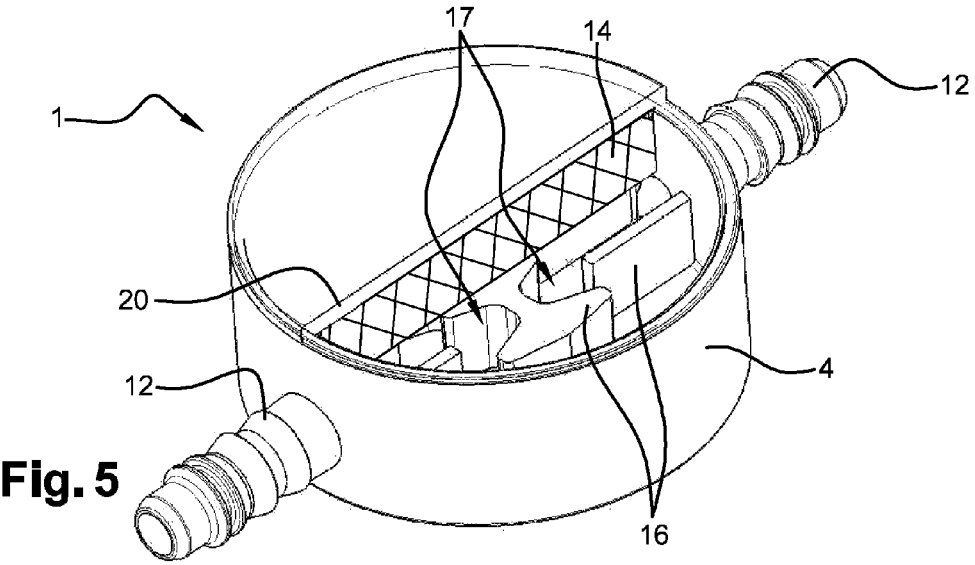
FIG. 5 is a schematic perspective view illustrating a dampening device in accordance with a third embodiment of the invention and whose plugging member and dampening member are partially truncated.
Figure 6:
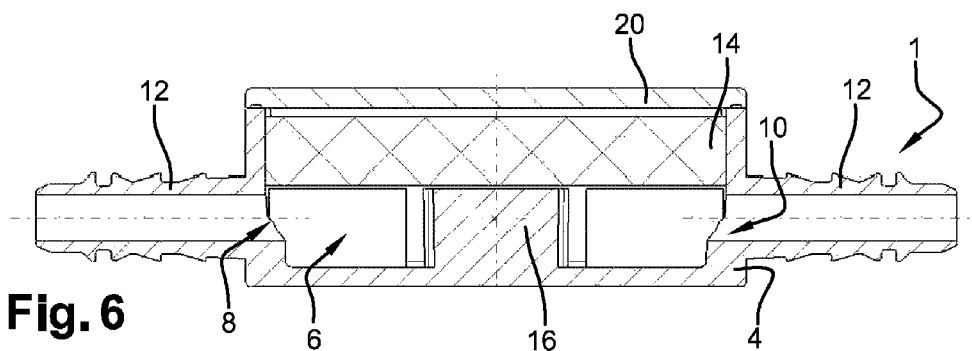
FIG. 6 is a view similar to FIG. 3 illustrating the dampening device of FIG. 5.

FIGS. 5 and 6 illustrate a dampening device 1 in accordance with a third embodiment. To the extent that the dampening device 1 of FIGS. 5 and 6 is similar to the dampening device 1 of FIGS. 1 to 3, the description of the dampening device 1, provided hereinbefore in relation with FIGS. 1 to 3, may be transposed to the dampening device 1 of FIGS. 5 and 6, with the exception of the remarkable differences set out below.

The dampening device 1 of FIGS. 5 and 6 differs from the dampening device 1 of FIGS. 1 to 3, because the dampening device 1 of FIGS. 5 and 6 comprises one single dampening member 14, whereas the dampening device 1 of FIGS. 1 to 3 comprises two dampening members 14.

In addition, the dampening device 1 of FIGS. 5 and 6 differs from the dampening device 1 of FIGS. 1 to 3, because the holding member 16 of FIGS. 5 and 6 is secured to the body 4. In this case, the holding member 16 is integral with the body 4.

Moreover, as in the first embodiment of FIGS. 1 to 3, the holding member 16 herein defines flow conduits 17 through which the fluid can flow with significant changes in the orientation of the fluid flow between the orifices 8 and 10.

Figure 7:
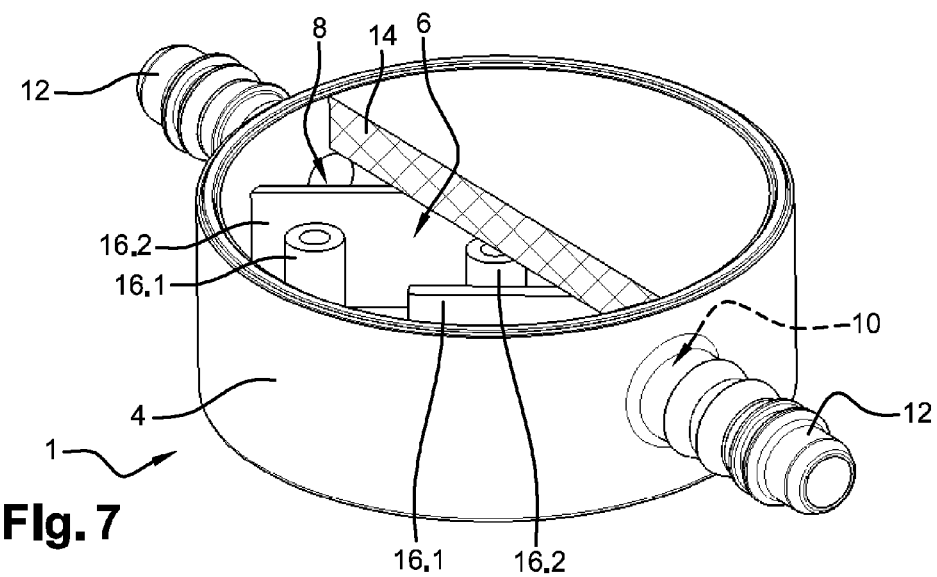
FIG. 7 is a schematic perspective view illustrating a portion of a dampening device in accordance with a fourth embodiment of the invention and whose dampening member is partially truncated.

FIG. 7 illustrates a dampening device 1 in accordance with a fourth embodiment. To the extent that the dampening device 1 of FIG. 4 is similar to the dampening device 1 of FIGS. 5 and 6, the description of the dampening device 1, provided hereinbefore in relation with FIGS. 5 and 6, may be transposed to the dampening device 1 of FIG. 7, with the exception of the remarkable differences set out below.

The dampening device 1 of FIG. 7 differs from the dampening device 1 of FIGS. 5 and 6, because the holding member 16 has a more simple geometry. Indeed, the holding member 16 of FIG. 7 is composed of pads 16.1 and rectangular plates 16.2. Each pad 16.1 has, in particular, the function of holding the foam of the dampening member 14. Each rectangular plate 16.2 has, in particular, the function of modifying the orientation of the fluid flow between the orifices 8 and 10. In other words, each rectangular plate 16.2 forms at least one baffle.

Figure 8:
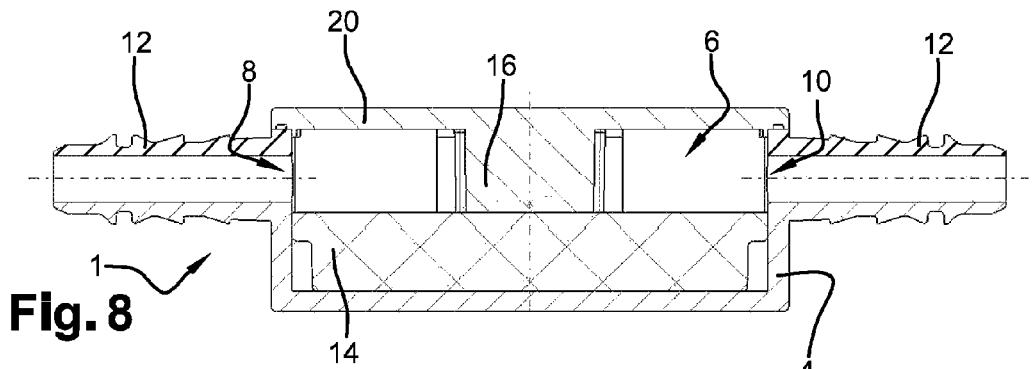
FIG. 8 is a view similar to FIG. 3 illustrating the dampening device in accordance with a fifth embodiment of the invention.
Figure 9:
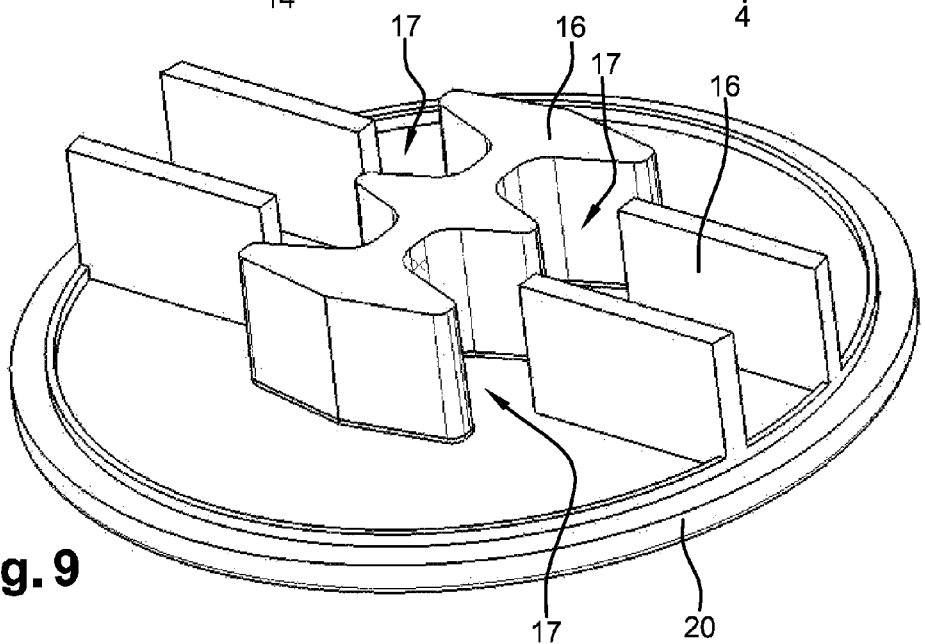
FIG. 9 is a schematic perspective view illustrating a plugging member belonging to the dampening device of FIG. 8.

FIGS. 8 and 9 illustrate a dampening device 1 in accordance with a fifth embodiment. To the extent that the dampening device 1 of FIGS. 8 and 9 is similar to the dampening device 1 of FIGS. 5 and 6, the description of the dampening device 1, provided hereinbefore in relation with FIGS. 5 and 6, may be transposed to the dampening device 1 of FIGS. 8 and 9, with the exception of the remarkable differences set out below.

The dampening device 1 of FIGS. 8 and 9 differs from the dampening device 1 of FIGS. 5 and 6, essentially because the holding member 16 of FIGS. 8 and 9 is secured to the plugging member 20, whereas the holding member 16 of FIGS. 5 and 6 is secured to the body 4. In this case, the holding member 16 is integral with the body 4.

Moreover, as in the embodiment of FIGS. 5 and 6, the holding member 16 herein defines flow conduits 17 through which the fluid can flow with significant changes in the orientation of the fluid flow between the orifices 8 and 10.

Figure 10:
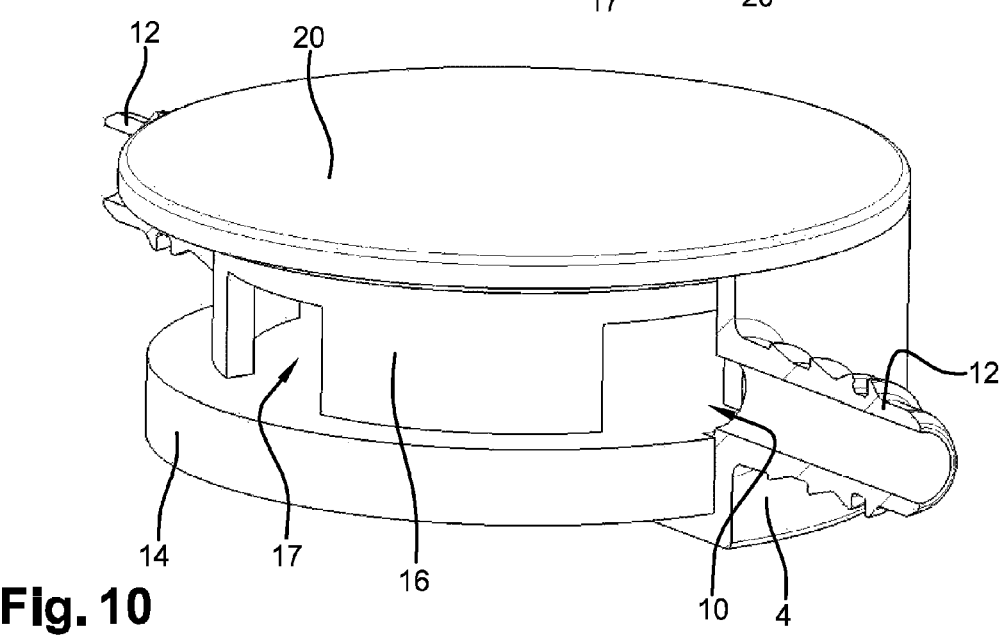
FIG. 10 is a partially-truncated schematic perspective view of a dampening device in accordance with a sixth embodiment of the invention.

FIG. 10 illustrates a dampening device 1 in accordance with a sixth embodiment. To the extent that the dampening device 1 of FIG. 10 is similar to the dampening device 1 of FIGS. 8 and 9, the description of the dampening device 1, provided hereinbefore in relation with FIGS. 8 and 9, may be transposed to the dampening device 1 of FIG. 10, with the exception of the remarkable differences set out below.

The dampening device 1 of FIG. 10 differs from the dampening device 1 of FIGS. 8 and 9, because the holding member 16 herein ensures a holding on peripheral regions of the dampening member 14, whereas the holding member 16 of FIGS. 8 and 9 ensures a holding on a central region of the dampening member 14 of FIGS. 8 and 9.

In addition, the dampening device 1 of FIG. 10 differs from the dampening device 1 of FIGS. 8 and 9, because the holding member 16 of FIG. 10 defines flow conduits 17 different from the flow conduits 17 of FIGS. 8 and 9, in particular with different orientation changes.

Figure 11:
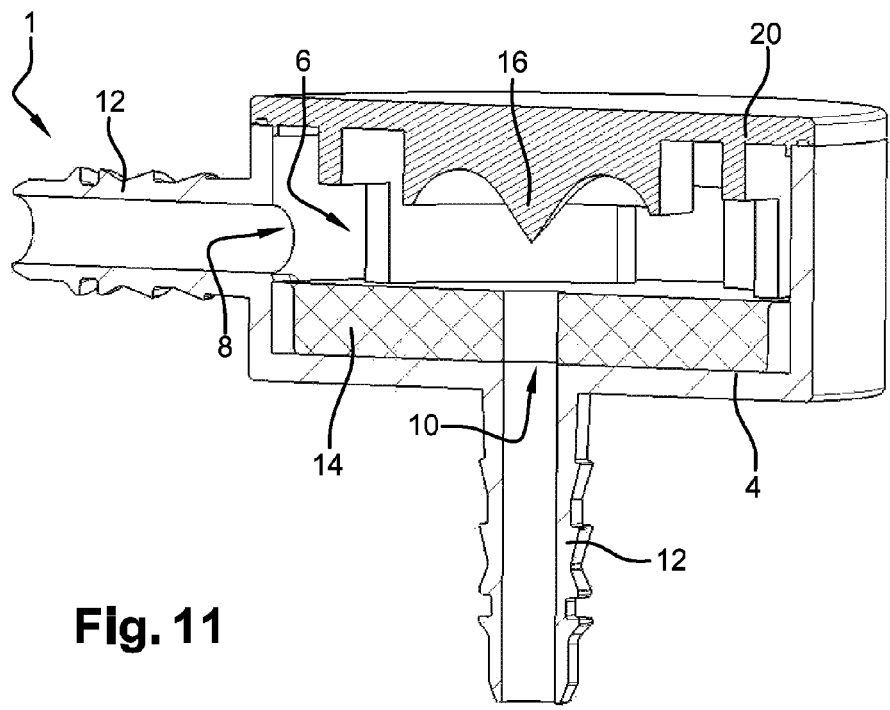
FIG. 11 is a truncated schematic perspective view illustrating a dampening device in accordance with a seventh embodiment of the invention.

FIG. 11 illustrates a dampening device 1 in accordance with a seventh embodiment. To the extent that the dampening device 1 of FIG. 11 is similar to the dampening device 1 of FIGS. 8 and 9, the description of the dampening device 1, provided hereinbefore in relation with FIGS. 8 and 9 may be transposed to the dampening device 1 of FIG. 11, with the exception of the remarkable differences set out below.

The dampening device 1 of FIG. 11 differs from the dampening device 1 of FIGS. 8 and 9, essentially because the orifices 8 and 10 are not aligned. Indeed, the nozzles 12 of the dampening device 1 of FIG. 11 form a 90-degree angle therebetween.

Furthermore, the dampening device 1 of FIG. 11 differs from the dampening device 1 of FIGS. 8 and 9, because the holding member 16 has a geometry comprising more curvatures. Nonetheless, the holding member 16 is integral with the plugging member 20 of FIG. 11, as in the case of FIGS. 8 and 9.

Figure 12:
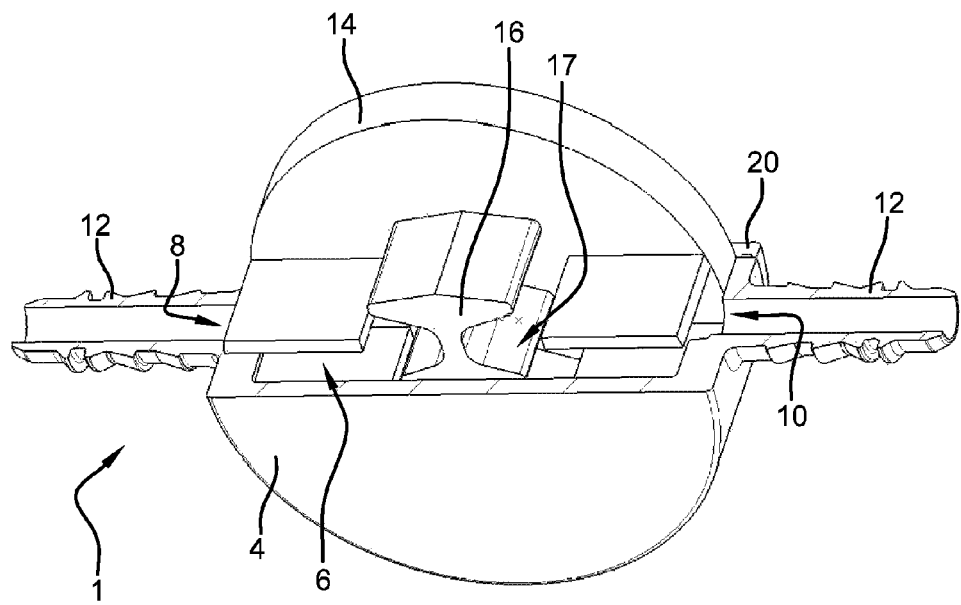
FIG. 12 is a partially-truncated schematic perspective view of a dampening device in accordance with an eighth embodiment of the invention.

FIG. 12 illustrates a dampening device 1 in accordance with an eighth embodiment. To the extent that the dampening device 1 of FIG. 12 is similar to the dampening device 1 of FIGS. 5 and 6, the description of the dampening device 1, provided hereinbefore in relation with FIGS. 5 and 6, may be transposed to the dampening device 1 of FIG. 12, with the exception of the remarkable differences set out below.

The dampening device 1 of FIG. 12 differs from the dampening device 1 of FIGS. 5 and 6, essentially because the dampening member 14 has a generally complex tridimensional shape. This dampening member 14 is made by injection molding.

In addition the dampening device 1 of FIG. 12 differs from the dampening device 1 of FIGS. 5 and 6, because the holding member 16 is integral with the dampening member 14, which simplifies the assembly of the dampening device 1. Thanks to the holding member 16, the dampening member 14 is wedged between the body 4 and the plugging member 20. Elements (patterns, protrusions/recesses, lugs, forms) may be provided in order to guarantee the relative positioning of the holding member 16, the dampening member 14, the body 4 and the plugging member 20.

Moreover, the holding member 16 also defines flow conduits 17 through which the fluid can flow with significant changes in the orientation of the fluid flow between the orifices 8 and 10.

Of course, the present invention is neither limited to the particular embodiments described in the present Patent Application, nor limited to embodiments within the reach of those skilled in the art. Other embodiments may be considered without departing from the scope of the invention, from any element equivalent to an element indicated in the present Patent Application.

The invention claimed is:

1. A dampening device, for dampening pressure pulsations which may propagate in a fluid conduit, the dampening device comprising:
    a body defining a chamber and having at least one orifice intended for the inlet and the outlet of the fluid in the chamber;
    at least one dampening member located in the chamber, the dampening member comprising at least one foam, said at least one foam being elastically deformable and including closed cells containing at least one compressible gas; and
    a holding member configured to hold the dampening member in place,
    wherein at least one of said at least one foam has a porosity comprised between 50% and 98%.

2. The dampening device according to claim 1, wherein at least one of said at least one foam includes open cells, the number of closed cells being larger than the number of open cells.

3. The dampening device according to claim 1, wherein at least one of said at least one foam has a compressive strength comprised between 15 kPa and 1000 kPa, the compressive strength being measured according to the ASTM D1056-07 test method at 25% of compression ratio of said foam.

4. The dampening device according to claim 1, wherein at least one of said at least one foam has a thickness comprised between 4 mm and 20 mm.

5. The dampening device according to claim 1, wherein at least one of said at least one foam is configured to present:
    a compliance larger than 2 cm$^3$ when the average pressure of the fluid is equal to 1 bar,
    a compliance larger than 2.5 cm$^3$ when the average pressure of the fluid is equal to 2 bar, and
    a compliance larger than 3 cm$^3$ when the average pressure of the fluid is equal to 3 bar.

6. The dampening device according to claim 1, wherein at least one of said at least one foam is configured to present a volume change larger than 0.5 cm$^3$/bar when the average pressure of the fluid is comprised between 0 and 3 bar and when the average temperature of the fluid is comprised between −30° C. and 130° C.

7. The dampening device according to claim 1, wherein the dampening member has a contact surface arranged so as to be in contact with a fluid flow when the fluid circulates in the chamber;
    the contact surface being sized so that the ratio between i) the surface area of the contact surface and ii) the volume of said at least one foam is larger than 50 m$^{-1}$.

8. The dampening device according to claim 1, wherein the dampening member has a contact surface arranged so as to be in contact with a fluid flow when the fluid circulates in the chamber;
    the contact surface being sized so that the ratio between i) the surface area of the contact surface and ii) the total surface area of the chamber is larger than 10%.

9. The dampening device according to claim 1, wherein the dampening member has a contact surface arranged so as to be in contact with a fluid flow when the fluid circulates in the chamber;
    the contact surface being sized so that the ratio between i) the surface area of the contact surface and ii) the surface area of a section of the body, along a plane which is perpendicular to a main direction of deformation of said at least one foam and which extends close to the contact surface, is larger than 60%.

10. The dampening device according to claim 1, wherein the body presents an opening in communication with the chamber, the dampening device further comprising a plugging member configured to plug the opening in a fluid-tight manner.

11. The dampening device according to claim 1, wherein the chamber has a volume smaller than 150 cm$^3$, and wherein at least one of said at least one foam has a foam volume representing between 15% and 70% of the volume of the chamber.

12. The dampening device according to claim 1, wherein the holding member defines at least one flow conduit through which the fluid can flow, said at least one flow conduit being configured to substantially modify the orientation of the fluid flow.

13. The dampening device according to claim 1, wherein at least one of said at least one foam is composed of a material selected from the group consisting of a hydrogenated poly(butadiene-acrylonitrile) (HNBR), a fluorocarbon (FKM) and a fluorosilicone (FVMQ), a crosslinked polyamide (PA), and a non-crosslinked polyamide (PA).

14. The dampening device according to claim 1, wherein the body presents an opening in communication with the chamber, the dampening device further comprises a plugging member configured to plug the opening in a fluid-tight manner, and at least one of said at least one dampening member is configured to delimit a free volume containing a compressible gas with the plugging member and the body.

15. The dampening device according to claim 1, wherein the body presents an opening in communication with the chamber, the dampening device further comprises a plugging member configured to plug the opening in a fluid-tight manner, and at least one of said at least one dampening member is configured to delimit a free volume containing a compressible gas with the plugging member.

16. The dampening device according to claim 1, wherein the body presents an opening in communication with the chamber, the dampening device further comprises a plugging member configured to plug the opening in a fluid-tight manner, and at least one of said at least one dampening member is configured to delimit a free volume containing a compressible gas with the body.

* * * * *